(12) United States Patent
Dreher

(10) Patent No.: US 7,745,966 B2
(45) Date of Patent: Jun. 29, 2010

(54) METHOD AND DEVICE FOR AN ACTUATOR MOTOR INCLUDING AN AIR-ACTUATED BRAKE DEVICE

(75) Inventor: Lincoln J. Dreher, Patoka, IN (US)

(73) Assignee: Hansen Corporation, Princeton, IN (US)

( * ) Notice: Subject to any disclaimer, the term of this patent is extended or adjusted under 35 U.S.C. 154(b) by 594 days.

(21) Appl. No.: 11/637,467

(22) Filed: Dec. 11, 2006

(65) Prior Publication Data

US 2008/0136275 A1    Jun. 12, 2008

(51) Int. Cl.
*H02K 7/10*    (2006.01)
*H02K 49/00*    (2006.01)

(52) U.S. Cl. .......................................... 310/77; 310/93

(58) Field of Classification Search .................... 310/77, 310/58–59, 61, 64; 454/256–259; 318/370–372
See application file for complete search history.

(56) References Cited

U.S. PATENT DOCUMENTS 3,112,081  A  *  11/1963  Filz ....................... 241/199.12
3,562,565  A  *  2/1971  Higashino et al. ............. 310/77
3,734,254  A  *  5/1973  Yanikoshi ..................... 192/16
5,406,180  A  *  4/1995  Feller, Jr. ..................... 318/372

\* cited by examiner

*Primary Examiner*—Quyen Leung
*Assistant Examiner*—Jose A Gonzalez Quinones
(74) *Attorney, Agent, or Firm*—Townsend and Townsend and Crew LLP

(57) ABSTRACT

A plurality of fan blades are secured to a rotor assembly of a single directional motor. When the motor is powered on, a force generated by the fan blades pushes the rotor assembly in a direction of a low friction thrust interface. When the motor is backdriven in a direction opposite the powered direction, the force generated by the fan blades pushes the rotor assembly in a direction of a higher-friction thrust interface, causing a tapered surface of the pinion and a tapered surface of a bearing retainer to be pressed against each other to produce a frictional braking force. The backdriven speed of the motor and drive device is therefore reduced, improving the reliability of the motor assembly. The invention can be applied to motor actuators used to control air dampers and other valves in gas or fluid delivery systems. The invention can also be used to reduce water hammer in water delivery systems.

10 Claims, 4 Drawing Sheets

METHOD AND DEVICE FOR AN ACTUATOR MOTOR INCLUDING AN AIR-ACTUATED BRAKE DEVICE

BACKGROUND OF THE INVENTION

The present invention is directed generally to air and fluid delivery systems. More particularly, the present invention provides a method and device for an actuator motor apparatus including an air-actuated brake device that causes a braking force when a motor actuator is back driven. Merely by way of example, the present invention provides techniques for an actuator motor apparatus for controlling air duct dampers. But it would be recognized that the invention has a much broader range of applicability. For example the invention can be applied to motor actuators used to control valves in various gas or fluid delivery systems. The invention can also be used to reduce water hammer in water delivery systems.

In an HVAC (Heating, Ventilation and Air-Conditioning) system, sometimes referred to as climate control system, extensive ductwork throughout a building is often used to control temperature and humidity of the air within a building. Such duct work is also often used to providing for smoke control, maintaining pressure relationships between spaces, and providing fresh air for occupants. For efficient climate control, electronic duct dampers are often used to shut off air flow to unoccupied or unused rooms, limiting the flow of heated or cooled air to those areas that really need it.

Conventional dampers often include valve actuators which are energized for a single direction of rotation and wind up an external spring when they travel in that direction. When power is removed, the external spring back drives the gear train and motor in the opposite direction and returns the valve to the original position. The speeds generated during back driving can often greatly exceed the speeds the motor travels when energized. The inertia that is built up during back drive can damage the gear train after repeated impacts. In water delivery systems using conventional valve actuators, such high speed back drive causes water valves to close quickly. The sudden interruption in water flow often causes a loud noise commonly known as water hammer. In some conventional actuator motors, a flexible rubber structure has been used as a braking device. In such braking devices, the flexible structure moves radially outward under centrifugal force as the rotational velocity of the motor increases. Such conventional braking devices are often complex and expensive and are often susceptible to reliability problems.

From the above, it is seen that improved techniques for controlling the speed of an actuator motor are desired.

BRIEF SUMMARY OF THE INVENTION

The present invention provides techniques directed generally to air and fluid delivery systems. More particularly, the present invention provides a method and device for an actuator motor apparatus including an air-actuated brake device that causes a braking force when a motor actuator is back driven. Merely by way of example, the present invention provides techniques for an actuator motor apparatus for controlling air duct dampers. But it would be recognized that the invention has a much broader range of applicability. For example the invention can be applied to motor actuators used to control valves in various gas or fluid delivery systems. The invention can also be used to reduce water hammer in water delivery systems.

In a specific embodiment, the present invention provides a motor apparatus including, in part, a rotor assembly, a motor pinion, a thrust pin, a bearing retainer, and a plurality of fan blades. In an embodiment, the rotor assembly includes a rotor shaft, and the rotor assembly is configured to be rotatable about an axial direction and is also adapted to be movable between a first position and a second position along the axial direction. The first and second positions are characterized by a first frictional braking force and a second frictional braking force, respectively. The motor pinion is coupled to the rotor assembly via the rotor shaft. The thrust pin is configured to be in contact with the rotor shaft when the rotor assembly is in the first position. The bearing retainer is configured to support the rotor shaft during rotation, and is configured to be in contact with the motor pinion when the rotor assembly is in the second position. In an embodiment, the plurality of fan blades are coupled to the rotor assembly, and the fan blades are configured to generate a first force that pushes the rotor assembly to the first position when the rotor assembly rotates in a first direction. The fan blades are further configured to generate a second force that pushes the rotor assembly to the second position during a portion of time when the rotor assembly rotates in a second direction opposite of the first direction.

In a specific embodiment, the first frictional braking force is generated when the rotor shaft is rotating and the rotor shaft is in contact with the thrust pin, and the second frictional braking force is generated when the motor pinion is rotating and the rotor pinion is in contact with the bearing retainer. In a particular embodiment, the first braking force is smaller than the second braking force. The motor pinion includes a first tapered surface and the bearing retainer includes a second tapered surface, the second tapered surface being characterized by a substantially same tapered angle the first tapered surface. In an embodiment, the thrust pin is positioned such that when the rotor shaft is in contact with the thrust pin, the first tapered surface of the motor pinion is separated from the second tapered surface of the bearing retainer by a predetermined distance. In some embodiments, the motor pinion is made of powered metal and the bearing retainer is made of hardened steel. In other embodiments, the motor pinion includes a surface layer that is made of powered metal, and the bearing retainer includes a surface layer that is made of hardened steel. In an embodiment, the thrust pin is made of hardened steel and the rotor shaft is made of hardened steel. In an embodiment, the motor apparatus also includes a spring device which is configured to backdrive the rotor device in the second direction opposite the first direction. In an embodiment, the fan blades are configured to reduce the rotational speed of the rotor assembly when the spring device backdrives the rotor assembly in the second direction opposite the first direction.

In another embodiment, the invention provides a damper assembly that includes a damper plate having a first plate position and a second plate position, the damper plate including a damper shaft. The damper assembly also includes a damper actuator apparatus coupled to the damper shaft, the damper actuator apparatus being configured to drive the damper plate between at least the first plate position and the second plate position. In an embodiment, the damper actuator apparatus includes a housing unit, and a drive motor configured within the housing unit, the drive motor including a drive member configured to be rotatable about an axial direction and movable between a first position and a second position along the axial direction. The damper actuator apparatus also includes a drive device coupled to the motor via the drive member, the drive device being configured to be driven in a first direction about the axial direction by the motor. The damper actuator apparatus further includes a spring device coupled to the drive device, and the spring device is configured to apply a torque to the drive device such that the drive device rotates in a return direction opposite to the first direction. In an embodiment, the damper actuator apparatus includes a plurality of fan blades coupled to the drive member. The fan blades are configured to generate a first force that pushes the drive member to the first position when the motor device rotates in the first direction. The fan blades are further configured to generate a second force that pushes the derive member to the second position during a portion of time when the motor device rotates in a second direction opposite of the first direction. In an embodiment, the first position of the drive member is characterized by a first frictional brake force, and the second position of the drive member is characterized by a second frictional braking force. In an embodiment, the second frictional braking force is larger than the first frictional braking force. In an embodiment, the drive member includes a motor pinion made of powdered metal, and the motor pinion is characterized by a first tapered surface. In another embodiment, damper actuator apparatus includes a bearing retainer has a second tapered surface, which is characterized by a substantially same tapering angle as the first tapered surface. In an embodiment, damper actuator apparatus includes a thrust pin configured to maintain a predetermined distance between the first tapered surface of the motor pinion and the second tapered surface of the bearing retainer when the rotor shaft is in contact with the thrust pin. In an embodiment the rotor shaft is made of hardened steel, and the thrust pin is made of hardened steel. In another embodiment, the drive member also includes a motor pinion having a first tapered surface which is covered by a surface layer made of powdered metal.

In an alternative embodiment, the invention provides a method of making a motor apparatus. The method first provides a rotor assembly including a rotor shaft and a plurality of fan blades coupled to the rotor assembly. The method includes adding a motor pinion to the rotor shaft, the motor pinion being adapted to include a first tapered surface, and providing a bearing retainer, the bearing retainer being adapted to support the rotor assembly during rotation. The method also includes adapting the bearing retainer to include a second tapered surface matching the first tapered surface, such that a frictional force is created when the first tapered surface is pressed against the second surface. The method then adds a thrust pin aligned with the rotor shaft. The thrust pin is positioned such that when the rotor shaft is in contact with the thrust pin, the first tapered surface of the motor pinion and the second tapered surface of the bearing retainer are separated by a predetermined distance. In an embodiment, the method further includes shaping the fan blades such that the fan blades generate a first force to push the rotor assembly towards the thrust pin when the rotor assembly is rotating in a first direction; and shaping the fan blades such that the fan blades generate a second force to push the motor pinion toward the bearing retainer when the rotor assembly is rotating in a second direction. In an embodiment, the method uses powered metal to make motor pinion and uses hardened steel to make the bearing retainer. In another embodiment, the method uses hardened steel to make the thrust pin and uses hardened steel to make the rotor shaft. In yet another embodiment, the method includes adapting a rotor stamping to include a plurality of fan blades to make a single part that includes both the rotor shaft and the fan blades.

In yet another embodiment the invention provides a method for using an actuator motor for driving a valve device. The method includes providing an actuator motor apparatus which includes an electric motor coupled to a drive mechanism, and the drive mechanism includes an air-actuated brake device and a spring device for back driving the drive mechanism. The actuator motor apparatus is coupled to a valve device. The method also includes supplying energy to the electric motor to rotate the drive mechanism in a first direction to move the valve device to a first position, and then reducing the energy to the electric motor to allow the spring device to cause the drive mechanism to rotate in a second direction, which is opposite the first direction, and cause the air-actuated brake device to be subjected to a frictional force to reduce a speed of rotation in the second direction.

In an embodiment of the method for using an actuator motor for driving a valve device, the frictional force is provided by a contact between a first surface of the drive mechanism and a stationary surface of the actuator motor apparatus when the drive mechanism is rotating in the second direction. In an embodiment, the air-actuated brake device also includes a plurality of fan blades coupled to the drive mechanism, and when the fan blades are rotating in the second direction, the fan blades provide a force that causes the first surface to be in contact with the stationary surface. When the fan blades are rotating in the first direction, the fan blades provides a second force that causes the first surface to be separated from the stationary surface. In a specific embodiment, the first surface can be a surface of a motor pinion in the drive mechanism, and the stationary surface can be a surface of a bearing retainer in the actuator motor apparatus.

Many benefits are achieved by way of the present invention over conventional techniques. For example, the invention provides a method and device to reduce back drive velocity of an actuator motor to prevent damage to the motor and gear train used in controlling dampers and valves. In addition, the invention also provides techniques that are useful in reducing water hammer in water delivery systems. Depending upon the embodiment, one or more of these benefits may be achieved. These and other benefits and various additional objects, features and advantages of the present invention can be more fully appreciated with reference to the detailed description and accompanying drawings that follow.

DETAILED DESCRIPTION OF THE INVENTION

The present invention provides techniques directed generally to air and fluid delivery systems. More particularly, the present invention provides a method and device for an actuator motor apparatus including an air-actuated brake device that causes a braking force when a motor actuator is back driven. Merely by way of example, the present invention provides techniques for an actuator motor apparatus for controlling air duct dampers. But it would be recognized that the invention has a much broader range of applicability. For example the invention can be applied to motor actuators used to control valves in various gas or fluid delivery systems. The invention can also be used to reduce water hammer in water delivery systems. Various additional objects, features and advantages of the present invention can be more fully appreciated with reference to the detailed description and accompanying drawings that follow.

Figure 1:
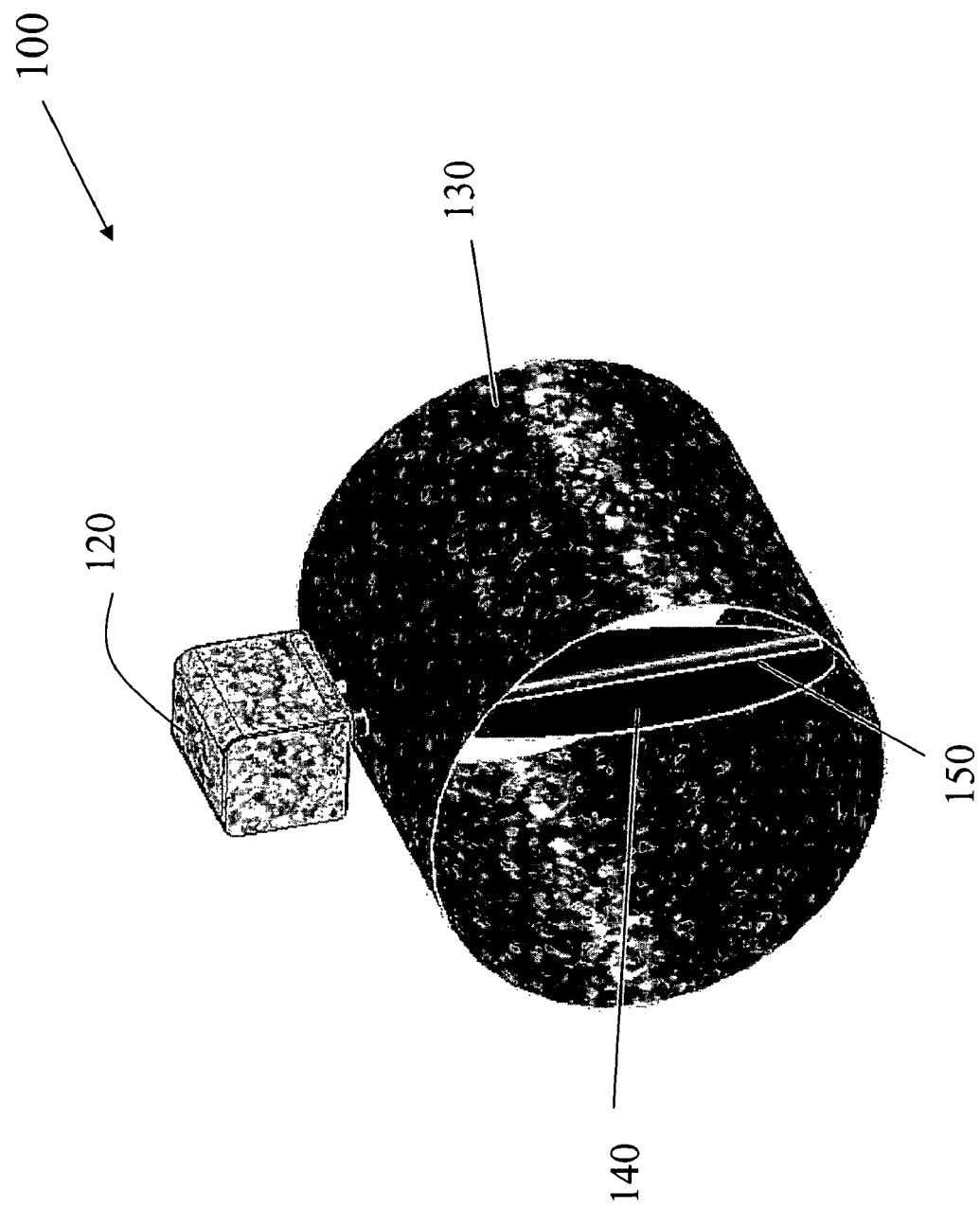
FIG. 1 shows a simplified illustration of a damper apparatus according to an embodiment of the present invention.

As an example, FIG. 1 shows a simplified illustration of an air duct damper apparatus according to an embodiment of the present invention. Damper apparatus 100 includes actuator apparatus 120 enclosed in a sealed housing, air duct 130, and damper plate 140. Damper plate 140 is coupled to a shaft 150 that can be operatively secured to, actuator apparatus 120. As will be discussed below, actuator apparatus 120 is configured to actuate damper plate 140 to move between at least an open and a closed positions in response to command signals from a controller or a manual switch (not shown in FIG. 1). Damper apparatus 100 can be used in duck work in air conditioning systems to regulate air flow and temperature in a building. Actuator apparatus 120 can be used with normally open or normally closed dampers. Further details of actuator apparatus 120 according to an embodiment of the invention is discussed below.

Figure 2:
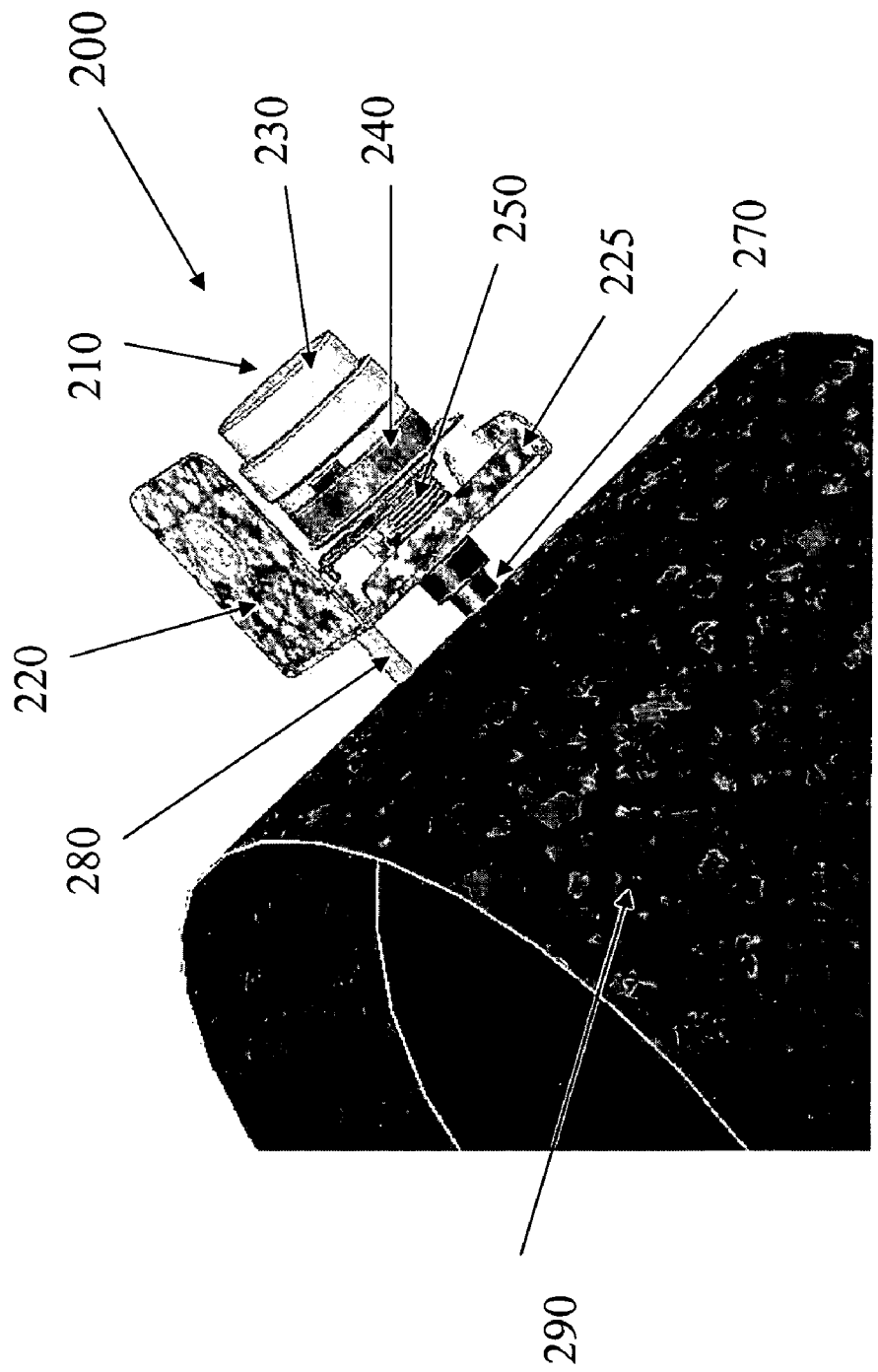
FIG. 2 shows a simplified illustration of a damper apparatus according to an embodiment of the present invention. The housing of the actuator apparatus has been partially removed to show certain details inside the actuator.

For instance, FIG. 2 shows a simplified illustration of an actuator apparatus 200 according to an embodiment of the present invention. As shown, actuator apparatus 200 is mounted on air duct 290 by a mounting support 280 and secured to damper shaft 270. As can be seen in FIG. 2, actuator apparatus 200 also includes a side housing panel 220 and a lower housing panel 225, whereas an upper housing panel and other side panels have been removed in order to show certain details of the actuator device. Actuator apparatus 200 also includes a release spring device 250, in addition to a motor apparatus 210 which is enclosed in a cavity formed by upper motor housing 230 and lower motor housing 240. Actuator apparatus 200 may further include a motor shaft and gear train (not shown in FIG. 2) which can be secured to damper shaft 270. Additionally actuator apparatus 200 can further include connectors to power supply and control panels, which are not shown in FIG. 2.

Certain operations of actuator apparatus 200 are now outlined below. Motor apparatus 230 can be energized for a single direction of rotation. As it rotates, motor apparatus 230 winds up release spring device 250. When power is removed, release spring device 250 back drives the gear train and motor apparatus 230 in the opposite direction. According to an embodiment of the present invention, an air-actuated brake device (hidden in the motor apparatus housing 230 and 240 in FIG. 2) is secured to the damper shaft 270 through a motor shaft and gear train such that when the motor is powered on, the frictional force generated by the brake device is negligible. When motor apparatus 230 is back driven by the release spring device 250 in the direction opposite the powered direction, the air-actuated brake device moves the motor shaft to engage a cone-shaped frictional brake, which reduces the rotating velocity of the motor apparatus.

In FIGS. 1 and 2, motor actuator 230 has been discussed in association with air duct damper applications. It is understood, however, that the examples and embodiments discussed herein are for illustrative purposes only. It will be obvious to a person skilled in the art to use motor actuator 230 to control valves in other fluid delivery systems. For example, motor actuator 230 can be used in a water delivery system to slow down back drive of a valve and reduce water hammer noises. Further details of the present motor actuator apparatus can be found throughout the present specification and more particularly below.

Figure 3:
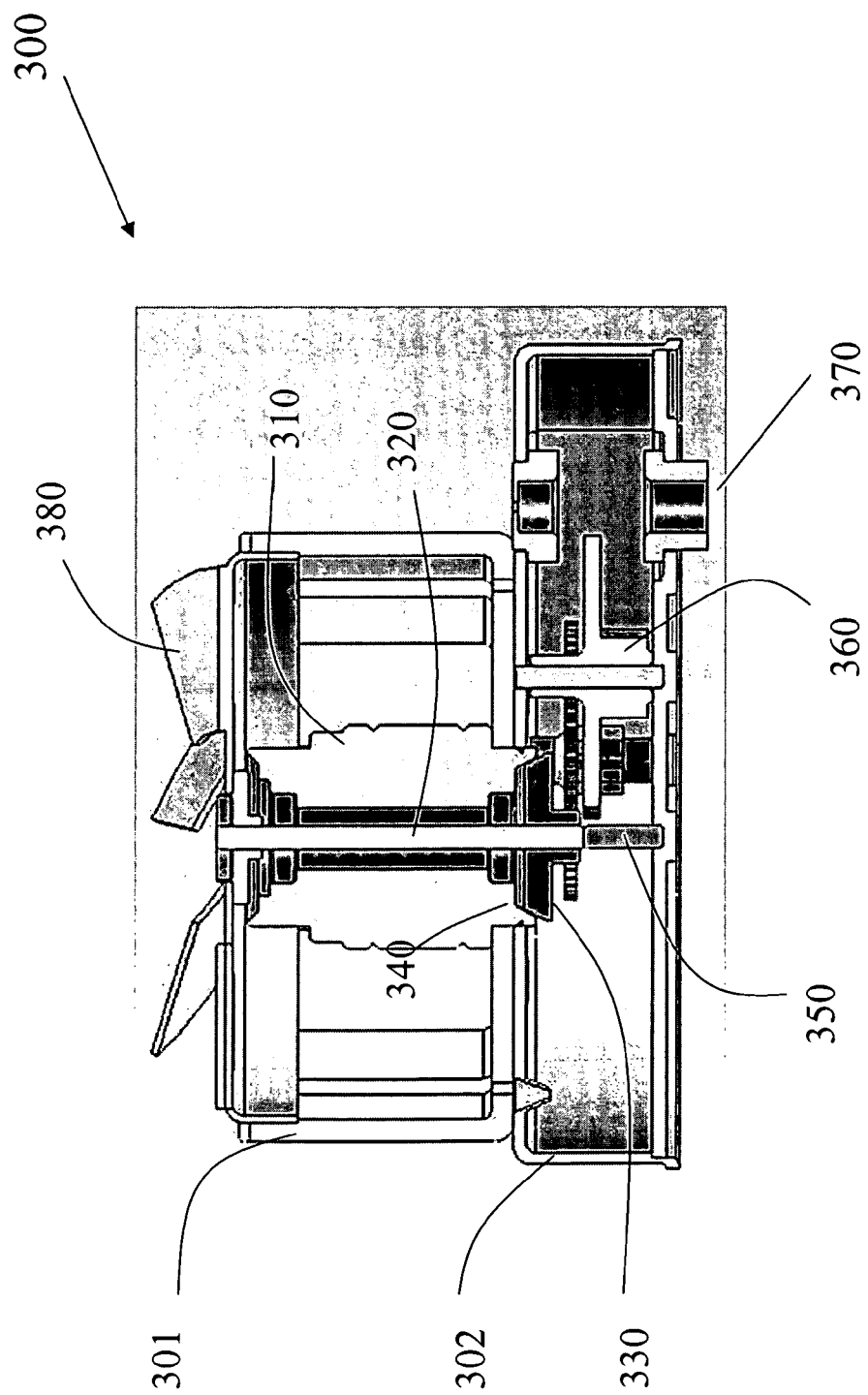
FIG. 3 shows a simplified illustration of a cross-sectional view of a motor device according to an embodiment of the present invention.

FIG. 3 shows a simplified illustration of a cross-sectional view of a motor device according to an embodiment of the present invention. As shown, motor apparatus 300 includes, in part, an upper housing member 301 and a lower housing member 302 coupled together to form a substantially sealed enclosure. Such an enclosure can be substantially free of dust particles. Motor apparatus 300 also includes a rotor assembly 310, rotor shaft 320, bearing retainer 340, and strike pin 350. Rotor shaft 320 is secured to rotor assembly 310 and is configured to be rotatable about an axial direction along rotor shaft 320. Bearing retainer 340 supports rotor shaft 320 and allows rotor assembly 310 to rotate freely. Bearing retainer 340 is also configured such that rotor shaft 320 is movable in an axial direction along rotor shaft 320 within a distance of approximately 1 mm. Rotor shaft 320 is also secured to a motor pinion 330, which is engaged to a drive device, for example, a gear train 360. In an embodiment, gear train 360 includes a motor drive shaft 370 which can be used to drive a valve, or a damper as illustrated previously in FIG. 2.

As shown in FIG. 3, according to a specific embodiment of the invention, motor apparatus 300 also includes a plurality of fan blades 380 attached to an end portion of rotor shaft 320. As is known in the art, the rotor of a motor is often drawn and stamped from steel. In an embodiment of the invention, a stamping is modified to make fan blades from the steel itself, making a single part that is both a rotor and a fan. In another embodiment, fan blades 380 can be made separately and then secured to rotor shaft 320. In a specific embodiment, motor pinion 330 is made from powdered metal and has a tapered, rearward facing surface. In an embodiment, bearing retainer 340 is made of steel and has a tapered face that matches the tapered surface of motor pinion 330. As a result, a frictional force can be created when a tapered surface of a rotating motor pinion 330 is pressed against a tapered surface of bearing retainer.

According to an embodiment of the invention, fan blades 380 are bent in a direction such that when rotor shaft 320 is rotating in a forward direction, fan blades 380 produces an air pressure that pushes rotor shaft 320 and motor pinion 330 away from bearing retainer 340. Under this condition, an end portion of rotor shaft 320 is pushed against thrust pin 350. In a specific embodiment, both rotor shaft 320 and thrust pin 350 are made of hard steel, and a low friction thrust interface is established when they come in contact. Thrust pin 350 is positioned to create a separation between the tapered surface of pinion 330 and the tapered surface of bearing retainer 340 when rotor shaft is in contact with thrust pin 350. In a specific embodiment, the separation is about 1 mm. When rotor assembly 310 is backdriven in a direction opposite to the forward direction, air pressure produced by fan blades 380 pushes rotor shaft 320 in an axial direction that causes motor pinion 330 to be pressed against bearing retainer 340. A braking force is produced between the tapered surface of motor pinion 330 and the matching tapered surface of bearing retainer 340. A cone brake action is thus created such that rotating speeds of rotor assembly 310 and drive device 360 are reduced. Damages caused by high speed backdrive can therefore be prevented.

According to an embodiment of the invention, a method is provided for making a motor apparatus including an air-actuated brake device. The method includes providing a rotor assembly including a rotor shaft and a plurality of fan blades, and shaping the fan blades such that the fan blades generate a force to push the rotor assembly towards one direction when the rotor assembly is rotating in a first direction and the fan blades generate a force to push the rotor assembly towards an opposite direction when the rotor assembly is rotating in a reverse direction. The method also includes adding to the rotor shaft a motor pinion which includes a tapered surface, and adding a bearing retainer which supports the rotor assembly during rotation and includes a tapered surface matching the tapered surface of the motor pinion, such that a frictional force is created when tapered surfaces are brought into contact with each other. The method further includes adding a thrust pin, such that when the rotor shaft is in contact with the thrust pin, the tapered surface of the motor pinion and the tapered surface of the bearing retainer are separated by a predetermined distance.

To increase frictional braking force, the method includes using powered metal to make motor pinion and using hardened steel to make the bearing retainer. To reduce frictional braking force when the motor is powered in the forward direction, the method includes using hardened steel to make the thrust pin and using hardened steel to make the rotor shaft. In an embodiment, a steel stamping for the rotor is modified to make fan blades from the steel itself, making a single part that is both a rotor and a fan. In another embodiment, fan blades can be made separately and then attached to the rotor shaft.

In yet another embodiment the invention provides a method for using an actuator motor for driving a valve device. As illustrated in the simplified flowchart in FIG. 4, the method 400 includes step 420 for providing an actuator motor apparatus which includes an electric motor coupled to a drive mechanism, and the drive mechanism includes an air-actuated brake device and a spring device for back driving the drive mechanism. The actuator motor apparatus is coupled to a valve device. The method also includes step 430 for supplying energy, for example, by turning on electricity, to the electric motor to rotate the drive mechanism in a first direction to move the valve device to a first position. The method also includes step 440 for reducing the energy, for example, by turning off electricity, to the electric motor to allow the spring device to cause the drive mechanism to rotate in a second direction, which is opposite the first direction, and cause the air-actuated brake device to be subjected to a frictional force to reduce a speed of rotation in the second direction.

Figure 4:
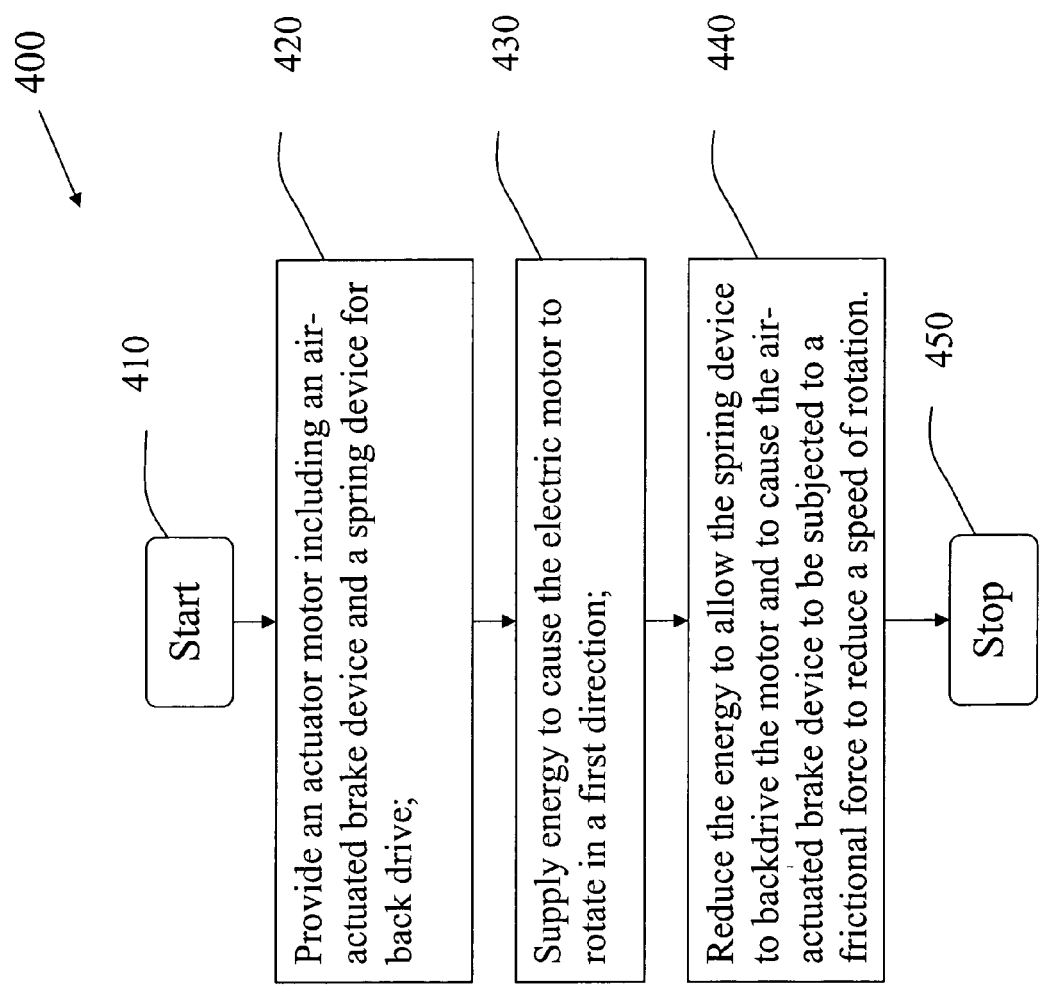
FIG. 4 shows a simplified flowchart of a method for using a motor device according to an embodiment of the present invention.

In an embodiment of the method shown in FIG. 4 for using an actuator motor for driving a valve device, the frictional force is provided by a contact between a first surface of the drive mechanism and a stationary surface of the actuator motor apparatus when the drive mechanism is rotating in the second direction. In an embodiment, the air-actuated brake device also includes a plurality of fan blades coupled to the drive mechanism, and when the fan blades are rotating in the second direction, the fan blades provide a force that causes the first surface to be in contact with the stationary surface. Such contact produces a frictional force which reduces a speed of rotation in the second direction. When the fan blades are rotating in the first direction, the fan blades provides a second force that causes the first surface to be separated from the stationary surface, thus reducing the frictional force. In a specific embodiment, the first surface can be a surface of a motor pinion in the drive mechanism, and the stationary surface can be a surface of a bearing retainer in the actuator motor apparatus. In an alternative embodiment, other suitable surfaces can be used.

As discussed above, embodiments according to the present invention provide for motor actuator devices that include an air-actuated brake device to reduce back drive speed of the motor. Such motor actuator devices according to embodiments of the invention can be applied in a variety of fluid delivery systems. For example, the motor apparatus can be used in an air duck damper or used in an electronic controlled valve device in a water delivery system, such as a sprinkler system.

It is also understood that the examples and embodiments described herein are for illustration purposes only, and that various modifications or changes in light thereof will be suggested to persons skilled in the art and are to be included within the spirit and purview of this application and the scope of the appended claims.

What is claimed is:

1. A motor apparatus, comprising:
   a rotor assembly including a rotor shaft, the rotor assembly being configured to be rotatable about an axial direction, the rotor assembly being also adapted to be movable between a first position and a second position along the axial direction, the first and second positions being characterized by a first frictional braking force and a second frictional braking force, respectively;
   a motor pinion coupled to the rotor assembly via the rotor shaft;
   a thrust pin, the thrust pin being configured to be in contact with the rotor shaft when the rotor assembly is in the first position;
   a bearing retainer, configured to support the rotor shaft during rotation, the bearing retainer being configured to be in contact with the motor pinion when the rotor assembly is in the second position; and
   a plurality of fan blades coupled to the rotor assembly, the fan blades being configured to generate a first force that pushes the rotor assembly to the first position when the rotor assembly rotates in a first direction, the fan blades being further configured to generate a second force that pushes the rotor assembly to the second position during a portion of time when the rotor assembly rotates in a second direction opposite of the first direction.

2. The motor apparatus as recited in claim 1, wherein the first frictional braking force is generated when the rotor shaft is rotating and the rotor shaft in contact with the thrust pin, and wherein the second frictional braking force is generated when the motor pinion is rotating and the rotor pinion is in contact with the bearing retainer.

3. The motor apparatus as recited in claim 1, wherein the first braking force is smaller than the second braking force.

4. The motor apparatus as recited in claim 1, wherein the motor pinion includes a first tapered surface and the bearing retainer includes a second tapered surface, the second surface being characterized by a substantially same tapered angle the first tapered surface.

5. The motor apparatus as recited in claim 1, wherein the thrust pin is positioned such that when the rotor shaft is in contact with the thrust pin, the first tapered surface of the motor pinion is separated from the second tapered surface of the bearing retainer by a predetermined distance.

6. The motor apparatus as recited in claim 1, wherein the motor pinion is made of powered metal and the bearing retainer is made of hardened steel.

7. The motor apparatus as recited in claim 1, wherein the motor pinion includes a surface layer that is made of powered metal, and the bearing retainer includes a surface layer that is made of hardened steel.

8. The motor apparatus as recited in claim 1, wherein the thrust pin is made of hardened steel and the rotor shaft is made of hardened steel.

9. The motor apparatus as recited in claim 1, further comprising a spring device, the spring device being configured to backdrive the rotor device in the second direction opposite the first direction.

10. The motor apparatus as recited in claim 1, wherein the fan blades are configured to reduce the rotational speed of the rotor assembly when the spring device backdrive the rotor assembly in the second direction opposite the first direction.

* * * * *